June 24, 1941.  G. G. BALCH  2,246,871
METHOD OF AND MEANS FOR INTRODUCING EDIBLE SEMISOLIDS TO ICE CREAM
Filed Nov. 7, 1939
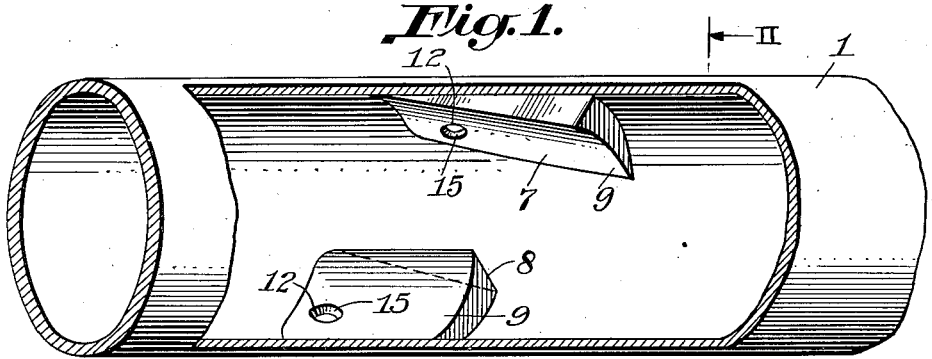
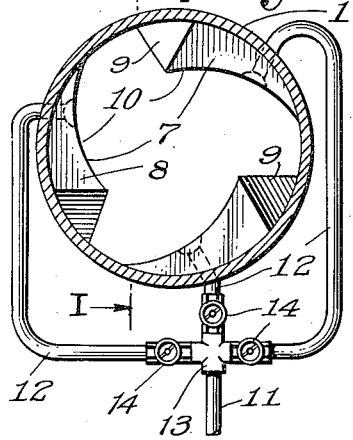
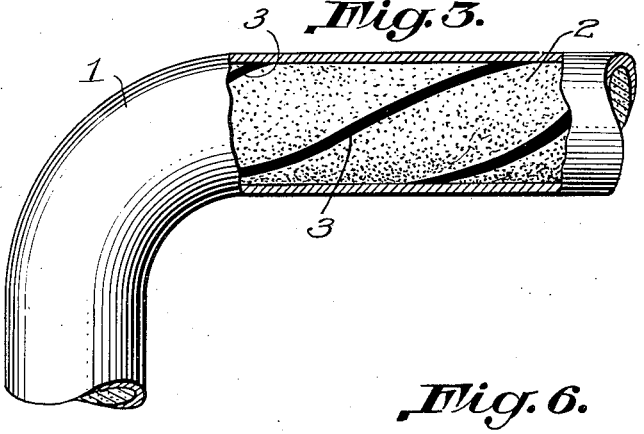
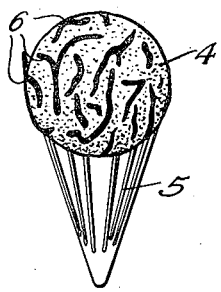
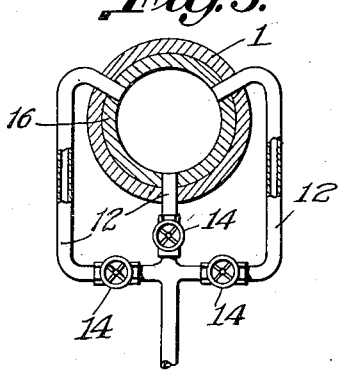
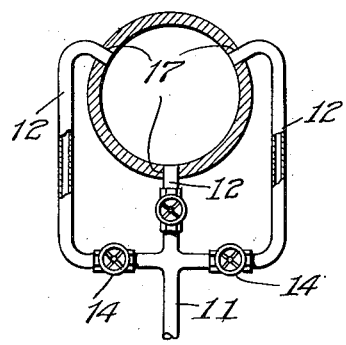
Inventor.
Gerald G. Balch Patented June 24, 1941

2,246,871

UNITED STATES PATENT OFFICE 2,246,871

METHOD OF AND MEANS FOR INTRODUCING EDIBLE SEMISOLIDS TO ICE CREAM

Gerald G. Balch, Pittsburgh, Pa.

Application November 7, 1939, Serial No. 303,330

5 Claims. (Cl. 107—54)

My invention relates to new and useful improvements in ice cream and more particularly to a method of and means for making ice cream containing edible semi-solids, the primary object being to provide ice cream and the method of and means for making the same in which pastes or semi-solids in the form of chocolate fudge, other flavored fudge, or any other semi-solid sweet flavored products are introduced thereto in the manufacture thereof.

A further object of the invention resides in the introduction of these semi-solids to ice cream in the conventional or regular form or method of making ice cream and without the use of an injection gun or the like.

A still further object of the invention resides in the method of evenly distributing these semi-solids into or onto a body of ice cream moving through a tube constituting part of an apparatus for forming ice cream by the continuous freezing method.

Another object of the invention is to provide an apparatus by means of which an edible material may be continuously applied to a moving mass of frozen ice cream mix and form thereon streaks of edible material which, when set by freezing, merge with the ice cream to form streaks of solid edible material extending longitudinally of the ice cream.

Another object of the invention is to provide an apparatus for applying streaks of semi-solid edible material to ice cream wherein ice cream mix passes through a tube or conduit where it is frozen to form a continuously advancing mass of ice cream, means being associated with the tube to form grooves extending longitudinally in the mass of ice cream, and other means being associated with the tube in cooperating relation to the groove-forming means for applying an edible material into the grooves to set therein and form streaks of solid edible material extending longitudinally of the advancing mass of ice cream.

Another object of the invention is to so apply ribs to walls of the tube through which the ice cream passes, that turning movement will be imparted to the advancing mass of ice cream and grooves formed which extend spirally about the ice cream. It will thus be seen that when the grooves are filled with edible material and the material set by freezing, there will be provided streaks of solid edible material extending spirally about the advancing mass of ice cream to impart an attractive appearance to the ice cream and also serve as a flavoring for the ice cream.

Another object of the invention is to provide an apparatus of this character adapted to be incorporated in an ice cream forming apparatus of a conventional continuous freezing type, wherein semi-solid ice cream passes from a freezer through a freezing tube to which the means for applying streaks of edible material is connected.

With these and numerous other objects in view, my invention consists in the novel method of application and the novel method of preparation as will be hereinafter and more particularly set forth.

It has been known that solids of candy or the like have been added to ice cream. Likewise, fruits have been added to ice cream. More recently, methods have been introduced for the injection, through the medium of an injection gun or the like, of solid chocolate and other candy as a core in a bar or stick of ice cream, but the disadvantages in the resultant product are that the injected products are hard and difficult to eat with ice cream, aside from the fact that a separate apparatus is necessary for the injecting of these products into the ice cream. My invention contemplates, as aforesaid, the introduction into the partially frozen ice cream of fudge or the like in semi-solid form, the semi-solid substance being applied in streaks which extend longitudinally of the mass of ice cream and becomes set, so that it merges with the ice cream and furnishes a decoration and flavoring for the ice cream. The resultant product, therefore, does not contain hard substances now present in ice cream into which edible solids are injected, and the resulting product will have the taste and give the sensation of an ice cream "sundae."

An apparatus for introducing edible semi-solids to ice cream in accordance with the improved method is illustrated in the accompanying drawing, wherein—

Figure 1 is a view showing a portion of a tube through which ice cream passes, a portion of the tube being shown in section along the line 1—1 of Figure 2 to disclose ribs by means of which furrows are formed in a moving mass of ice cream to receive the edible semi-solids;

Figure 2 is a sectional view taken transversely through the tube along the line 2—2 of Figure 1;

Figure 3 is a view showing a tube with a portion thereof broken away and ice cream within the tube to which the edible semi-solid matter has been applied in accordance with the invention;

Figure 4 is a perspective view of a cone filled with ice cream made in accordance with the invention;

Figure 5 is a view similar to Figure 2 showing a modified form of means for applying the edible semi-solid material to the ice cream; and Figure 6 is a view similar to Figures 2 and 5 showing another modified form of means for applying the edible semi-solid material to the ice cream.

The tube which is indicated in general by the numeral 1 is a portion of a tube through which frozen semi-solid ice cream moves from a freezer to a storage can or the like during making of ice cream by the continuous freezing method. According to this method ice cream is forced through the tube 1 and as the partially frozen ice cream moves through the tube, the low temperature of the refrigerant employed for cooling the tube causes freezing of the ice cream to be completed and the same transformed into a solid or semi-solid mass. The frozen or semi-frozen mass of ice cream passes from the tube 1 into storage cans, these cans when filled being transferred to a refrigerating room or chamber where they remain until the cans are transported to a drug store or other establishment where the ice cream is scooped from the cans for sale. The ice cream which is indicated in general by the numeral 2 and moves through the tube 1 is to have edible semi-solids applied thereto and referring to Figure 3, it will be seen that the edible semi-solid matter 3 is applied in the form of streaks which extend longitudinally of the mass of ice cream and in the preferred embodiment will follow spiral paths about the ice cream. By so applying the edible solid matter, it will be evenly distributed and when a can is filled with the semi-solid ice cream and allowed to set for a suitable length of time before being delivered to a store, a scoop of ice cream 4 removed from the can and placed in an ice cream cone 5, will contain streaks 6 of the edible solid matter. These streaks of edible solid matter 6 cause the ice cream to have an attractive appearance as well as constituting a flavoring for the ice cream. As previously stated, the edible solid matter may be chocolate, fruit juices, candy or other edible materials which may be applied to the moving mass of ice cream in a semi-solid state and become set as it moves with the tube with the ice cream.

In order to apply the edible semi-solid matter in the form of spirally extending streaks 3, a section of the pipe 1 has ribs 7 mounted therein as shown in Figures 1 and 2. The ribs 7 extend longitudinally of the tube and spirally thereof against the inner surface of walls of the tube. It should also be noted that the ribs are substantially triangular in cross section to provide surfaces 8 and 9 converging and intersecting to form edges 10 adapted to force their way into the mass of ice cream 2 and form furrows in the ice cream. Each of the ribs gradually increases in depth or thickness from one end to its other end so that as the mass of frozen ice cream is advanced through the pipe or tube 1, the furrows will be gradually deepened. The fact that the ribs extend longitudinally in the tube, spirally thereof, causes a turning motion to be imparted to the mass of frozen ice cream as this frozen mass is advanced through the tube. Therefore, the furrows will extend spirally about the advancing mass of ice cream mix.

The grooves or furrows formed in the frozen mass of ice cream are to be filled with the edible solid matter such as fudge or the like and in order to supply this material, there has been provided a main pipe 11 leading from a source of supply and having branches 12 connected with the main pipe 11 by means of a coupling 13 and each controlled by a valve 14 for regulating flow of the edible material through the branch pipes. In the present illustration, there have been shown three ribs 7 and, therefore, the pipe 11 has been provided with three branch pipes 12 but it is to be understood that any number of ribs may be provided and a corresponding number of branch pipes. The branch pipes extend through the walls of the tube or pipe 1 and also through the ribs and each terminates in a flared mouth 15 through which the fudge or other edible material is discharged into the groove formed by the rib through which the branch pipe passes. The edible material fills the grooves or furrows formed by the ribs and forms the streaks 3 extending longitudinally of the mass of frozen ice cream. The ice cream with the edible material applied thereto continues its movement through the pipe 1 and upon reaching the end of this pipe is discharged therefrom into a can which when filled is placed in a refrigerated storage chamber or room where it is allowed to remain until the ice cream has fully set. During filling of the can with the ice cream, the streaks of edible solid matter will be broken to some extent and distributed through the mass of ice cream. Therefore, when the ice cream is delivered to a store and a portion 4 of the ice cream scooped from a can and placed in a cone 5, as shown in Figure 4, the edible solid matter will be distributed in the scoop of ice cream in the form of irregularly extending streaks 6. This is clearly shown in Figure 4 and as previously stated, the streaks of edible material imparts an attractive appearance to the ice cream when served in a cone or plate and also constitutes flavoring means for the ice cream.

Instead of applying the edible semi-solid matter in the form of streaks extending spirally about the frozen ice cream, it may be applied in the form of streaks extending longitudinally of the ice cream but not spirally thereof. In order to so apply the edible semi-solid matter, a ring 16 is used in place of the ribs 7. This ring extends circumferentially in the tube or pipe 1 and the branch pipes 12 extend through the walls of the tube and also through the ring in spaced relation to each other circumferentially thereof with their inner ends terminating flush with the surface of the ring. In this embodiment of the invention, the streaks of edible material are applied to the mass of ice cream as a surface application instead of by forming grooves or furrows in the ice cream and then filling these grooves or furrows with the chocolate or other edible semi-solid material.

In Figure 6, there has been shown a further modified form of apparatus wherein the ribs 7 and the ring 16 are both omitted and ends of the branch pipes 12 merely secured through openings 17 formed through walls of the tube or pipe 1 in spaced relation to each other circumferentially thereof with their inner ends flush with the inner surface of the pipe. In this embodiment of the invention as well as in that illustrated in Figure 5, the chocolate or similar material flows through the branch pipes from the main pipe and is deposited upon the moving mass of ice cream in the form of streaks extending longitudinally of the ice cream.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

What is claimed is:

1. The method of introducing edible material to a mass of ice cream comprising advancing a mass of frozen ice cream mix along a defined path, forming spirally extending grooves along the advancing mass of frozen mix at points spaced from each other circumferentially thereof, grooves with edible material contrasting with the mix to form streaks of edible material extending longitudinally of the frozen mass and spirally about the same, continuing movement of the frozen mass through the conduit to set the applied material, and discharging the frozen mass and the edible material applied thereto into a container to fill the container with a mass of frozen ice cream mix having the applied material irregularly distributed therein.

2. The method of introducing edible solids to a frozen confection comprising advancing a mass of frozen mix, forming longitudinally extending grooves in the moving mass and imparting turning movement to the advancing mass to cause the grooves to extend spirally about the same, and filling the grooves with an edible material of a texture adapting it to set by chilling temperatures and form streaks of edible solid material extending longitudinally of the frozen mass and spirally about the same.

3. In an apparatus for applying edible solids to a frozen confection, a conduit through which partially frozen mix is adapted to be passed and formed into a moving mass of confection, and means communicating with the interior of said conduit at points spaced from each other circumferentially thereof for forming spirally extending grooves in the moving mass of frozen confection and filling the grooves with edible material adapted to be frozen therein and thus form streaks of edible material extending spirally about the mass of frozen confection.

4. In an apparatus for introducing edible material to a frozen confection, a conduit through which partially frozen mix is adapted to pass and be formed into a frozen mass as it moves through the conduit, ribs mounted in said conduit against walls thereof, said ribs extending longitudinally of the conduit and spirally thereof for imparting turning movement to the frozen mass and forming spirally extending grooves therein as the frozen mass is advanced through the conduit, and means for delivering edible material through walls of the conduit in cooperating relation to said ribs and depositing material in the grooves as the material is advanced through the conduit, whereby the applied material will be set by freezing and formed into streaks extending longitudinally of the ice cream and spirally about the same.

5. In an apparatus for introducing edible semi-solids to a frozen confection, a conduit through which partially frozen mix is adapted to be moved and frozen while in motion to form a mass of frozen confection advancing through the tube, ribs mounted in said tube against walls thereof in spaced relation to each other longitudinally of the tube, said ribs extending spirally in the tube and each increasing in depth from one end towards its other end and having side faces converging and intersecting to form a ridge extending longitudinally of the rib, said ribs serving to impart turning movement to a mass of frozen confection advancing through the tube and form grooves extending spirally about the mass of frozen confection, and a pipe having branches leading therefrom with their end portions passing through the walls of the tube and through said ribs for depositing edible material in the grooves formed by the ribs, the applied material when set forming streaks of edible material extending longitudinally of the mass of frozen confection and spirally about the same.

GERALD G. BALCH.